Dec. 31, 1940.   J. M. HILDABOLT   2,227,307
BEARING STRUCTURE
Filed March 2, 1939

INVENTOR
John M. Hildabolt
BY
Spencer Hardman & Fehr
his ATTORNEYS

Patented Dec. 31, 1940

2,227,307

UNITED STATES PATENT OFFICE 2,227,307

BEARING STRUCTURE

John M. Hildabolt, Dayton, Ohio, assignor to General Motors Corporation, Detroit, Mich., a corporation of Delaware Application March 2, 1939, Serial No. 259,311

8 Claims. (Cl. 308—240)

This invention relates to bearing structures and is particularly concerned with porous metal bearings having high lubricating qualities.

Porous metal bearings, commonly termed self-lubricating bearings, can be fabricated in varying degrees of porosity for holding varying quantities of oil. This oil is impregnated into the bearing and is held within the porous metallic sponge network thereof. Due to capillarity within the intercommunicating pores of the bearing, the oil gradually exudes at the surface thereof and lubricates the shaft that is journalled therein. Many of these bearings are installed with an external oil reservoir therearound for replenishing the oil supply and for keeping the bearing substantially full of lubricant at all times. There are, however, numerous applications of porous metal bearings wherein the external oil reservoir cannot be provided, and wherein the bearing must be of sufficient porosity to hold enough oil for long period lubrication. When heavy shaft loading is inherent to the bearing application, high porosity bearings are impractical due to their lower degree of strength. It is therefore an object of this invention to provide a porous metal bearing which has sufficient strength to function properly under heavy shaft loading, and which also has sufficient porosity to hold a relatively large supply of lubricant therein.

Another object of the invention is to provide a relatively inexpensive bearing having the heretofore mentioned qualities by furnishing the bearing with portions of porous metal of high strength and portions of porous metal of high porosity.

A further object of the invention is to provide a bearing including three rings of porous metal which are held by a retaining shell of a dense metal, wherein the middle ring is of a relatively higher degree of porosity than the two end rings.

Further objects and advantages of the present invention will be apparent from the following description, reference being had to the accompanying drawing wherein a preferred embodiment of the present invention is clearly shown.

Figure 1:
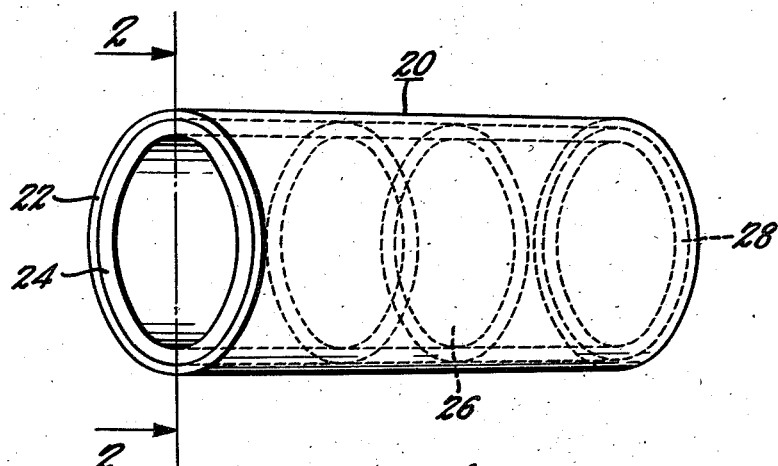
Fig. 1 is a view in perspective of a preferred embodiment of the invention.
Figure 2:
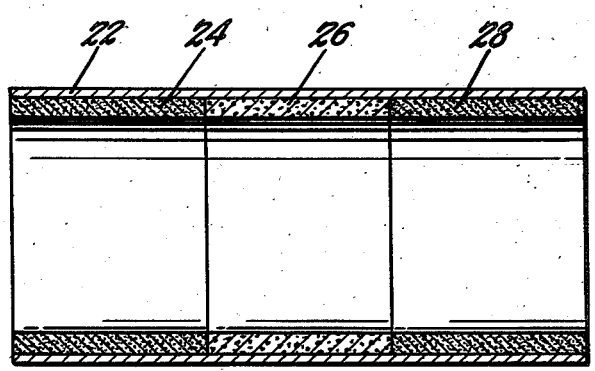
Fig. 2 is a view taken on line 2—2 of Fig. 1.

Referring to the drawing, and more particularly to Fig. 1, 20 indicates a bearing structure, which includes a cylindrical retaining shell 22, preferably of steel or some other dense metal, which may be made from seamless tubing or which may be made from rolled flat stock. The shell 22 holds and aligns three porous metal sections 24, 26 and 28 of annular shape. The sections 24, 26 and 28 are pressed into the shell 22 and are thereby held concentric with respect to one another.

Porous metal sections 24 and 28 are preferably fabricated by the method disclosed in the Williams Patent No. 1,556,658, wherein powdered metals are briquetted into the desired shape under high pressure and are then sintered under non-oxidizing conditions to form a homogeneous porous structure. The present invention is not limited to the specific ingredients disclosed in the Williams patent, since the bearings may be formed from any number of metal powders such as, copper and tin powders, copper and nickel powders, iron powder, copper and iron powder, etc., and may include small quantities of other metals such as lead and also small quantities of graphite therein. The porous metal sections 26 and 28, made by this method, have sufficient porosity to absorb various quantities of lubricant, and this porosity varies with the briquetting pressure. The porosity may likewise be controlled by the use of void forming compounds such as zinc stearate powder as proposed in the patent to Koehring No. 2,097,671, or the void forming compounds can be chosen from the group including the fatty acids, metallic salts thereof, salicylic acid, ammonium chloride, etc.

The section 26 is of a considerably higher degree of porosity than sections 24 and 28, and is of a relatively lower degree of strength. The section 26, due to its high degree of porosity, can absorb much more lubricant than either of the adjacent sections. High porosity metal, such as used in section 26, may be easily fabricated by the loose powder method as disclosed in the Davis application, Serial No. 85,889, filed June 8, 1936, now matured into Patent Number 2,157,596 issued May 9, 1939, and assigned to the assignee of the present application. This highly porous material can be rolled into an annular shape and can be made in substantially the same thickness as the thickness of the other portions of the bearing.

The three sections 24, 26 and 28 are then pressed endwise into the retaining shell and form a substantially unitary bearing surface. The bearing sections may be impregnated before pressing them into the shell or they may be impregnated after they have been assembled into the shell. In either case the highly porous section 26 is preferably impregnated with lubricating grease, and due to its high porosity retains relatively large quantities of the grease. The center section 26 of the bearing does not necessarily have to be in complete contact with the shaft, but may be in such a thickness that only the high points thereon touch the shaft. Thus the accuracy with which the center section is made is not so great as to produce a production burden. It is to be understood of course that the highly porous material can be sized by pressing the same between two flat plates to substantially any thickness desired without greatly reducing the porosity thereof, since such a sizing operation tends to mushroom the high points on the sheet rather than compress the porous main body of the sheet. It is also manifest that the center section 26 could be fabricated in a continuous annular ring by molding the same in a graphite mold having an annulus cut therein of the desired size. It is, however, preferable to use flat stock as the cost of production is considerably less.

From the foregoing it is apparent that I have provided a bearing, including sections 24 and 28, of high strength which carry the main load on the bearing, and a section 26, of relatively higher porosity, which contains a substantial quantity of lubricant within the pores thereof. The invention is not limited to the use of three ring sections, but may be successfully carried out with the use of two or more sections of varying degrees of porosity. Furthermore, the sections 24 and 28, if desired, may be made of rolled bronze rather than porous metal. It has been found that a highly porous section 26 of approximately ¼ inch width provides sufficient lubrication in bearings up to ½ inch in diameter and approximately 1 inch long. Obviously, the width of the section 26 can be varied to obtain any degree of lubrication desired. Experiments have shown, that bearings fabricated as herein described, increase the life of the bearing up to 300% over bearings fabricated of the material used in rings 24 and 28, wherein the highly porous section 26 is not included and therefore a lack of lubrication is experienced.

While the embodiment of the present invention as herein disclosed, constitutes a preferred form, it is to be uderstood that other forms might be adopted, all coming within the scope of the claims which follow.

What is claimed is as follows:

1. A bearing structure comprising, a cylindrical retaining shell of a dense metal, and an internal lining of porous metal therefor including an annular portion of relatively more porous metal than the remainder of the lining.

2. A bearing structure comprising, a cylindrical retaining shell of a dense metal, and an internal lining of porous metal therefor including an annular portion intermediate the ends thereof of relatively more porous metal than the remainder of the lining.

3. A bearing structure comprising, a cylindrical retaining shell, a plurality of annular rings of porous metal pressed therein to form a lining therefor, at least one of said rings being of a greater degree of porosity than the remainder of said rings.

4. A bearing structure comprising, a retaining shell, at least three annular rings of porous metal pressed therein to form a lining therefor, alternating rings being of a similar degree of porosity while the intermediate ring or rings are of a higher degree of porosity.

5. A bearing structure comprising, at least two annular portions of porous metal, one of said portions being relatively more porous than the other portion, and a retaining means for holding said portions concentric.

6. A bearing structure comprising, three ring portions of porous metal, a cylindrical steel retaining shell adapted to receive said rings and hold them concentric with one another, said middle ring being of a higher degree of porosity than either of the end rings.

7. A bearing structure comprising, a retaining shell of a dense metal and including an internal lining of a bearing material pressed therein, said lining having an annular portion intermediate the ends thereof of a highly porous metallic material impregnated with a lubricating grease said annular portion having a greater degree of porosity than the remainder of the internal lining.

8. A bearing structure comprising, a plurality of annular rings of porous metallic material and a retaining member adapted to receive said rings for holding them in alignment, at least one of said rings having a greater degree of porosity than the remaining rings.

JOHN M. HILDABOLT.